United States Patent
Lewis et al.

(10) Patent No.: US 10,122,160 B2
(45) Date of Patent: Nov. 6, 2018

(54) POWER DISTRIBUTION SYSTEMS

(71) Applicant: IBAR (EMEA) Ltd, Kendal Cumbria (GB)

(72) Inventors: Wayne Lewis, Kendal Cumbria (GB); Paul Richard Lippiatt, Kendal Cumbria (GB); Martin Peter Timbrell, Kendal Cumbria (GB)

(73) Assignee: IBAR (EMEA) Limited, Kendal, Cumbria (GB)

( * ) Notice: Subject to any disclaimer, the term of this patent is extended or adjusted under 35 U.S.C. 154(b) by 0 days.

(21) Appl. No.: 15/683,083

(22) Filed: Aug. 22, 2017

(65) Prior Publication Data

US 2018/0062368 A1 Mar. 1, 2018

(30) Foreign Application Priority Data

Aug. 24, 2016 (EP) ..................... 16185575

(51) Int. Cl.
| | | |
|---|---|---|
| H02G 5/08 | (2006.01) | |
| H01R 25/14 | (2006.01) | |
| H01H 71/02 | (2006.01) | |
| H01H 71/10 | (2006.01) | |

(52) U.S. Cl.
CPC ............ *H02G 5/08* (2013.01); *H01H 71/02* (2013.01); *H01H 71/10* (2013.01); *H01R 25/142* (2013.01)

(58) Field of Classification Search
CPC .......... H02G 5/08; H01H 71/02; H01H 71/10; H01R 25/142
USPC ............................... 174/520, 72 R
See application file for complete search history.

(56) References Cited

U.S. PATENT DOCUMENTS

| | | | | |
|---|---|---|---|---|
| 7,407,406 B2* | 8/2008 | Arlitt | .............. | H01R 4/24 |
| | | | | 439/404 |
| 7,901,402 B2* | 3/2011 | Jones | ................ | A61B 18/1492 |
| | | | | 606/41 |
| 2011/0187315 A1* | 8/2011 | McGinley | ........... | H01R 13/665 |
| | | | | 320/107 |
| 2015/0311654 A1* | 10/2015 | McCauley | ........... | H01R 25/142 |
| | | | | 439/122 |

FOREIGN PATENT DOCUMENTS

| | | | | |
|---|---|---|---|---|
| DE | 19540334 A1 * | 4/1997 | ............ | H01H 9/104 |
| EP | 1811622 A1 | 7/2007 | | |

(Continued)

OTHER PUBLICATIONS

European Search Report for EP 16185575A, search report dated Feb. 13, 2017.

(Continued)

*Primary Examiner* — Timothy Thompson
*Assistant Examiner* — Charles Pizzuto
(74) *Attorney, Agent, or Firm* — Howson & Howson LLP (57) ABSTRACT

A tap off box (22) for use with a busbar trunking system (24) comprising at least one conducting bar (26), the tap off box (22) comprising: an inlet contact (34); a movable sheath (36) for the inlet contact (34); and an electrical outlet (50) in electrical communication with the inlet contact (34), wherein, when the tap off box (22) is in a mounted position on the busbar trunking system (24), movement of the sheath (36) to a first position breaks an electrical connection between a conducting bar (26) and the electrical outlet (50).

19 Claims, 5 Drawing Sheets

(56) References Cited

FOREIGN PATENT DOCUMENTS

EP 2940818 A1 11/2015
GB 595819 A 12/1947

OTHER PUBLICATIONS

E&I Powerbar Engineering Group, "Intelligent Medium Powerbar", Brochure, pp. 1-7, 2015 (month unknown).
Universal Electric Corporation, "Starline Track Busway, Product Selection Guide", Brochure, pp. 1.1-15.13, Dec. 2014.
Smiths Interconnect/PDI, "Powerwave Bus System with Toughrail Technology", slide presentation, pp. 1-16, 2012 (month unknown).
Eaton, "Pow-R-Flex Low Ampere Busway—Flexible Power Distribution Solutions", Brochure, pp. 1-12, Mar. 2014.
Schneider Electric, "Powerbus Busway", Brochure, pp. 1-6, Feb. 2014.

* cited by examiner

POWER DISTRIBUTION SYSTEMS

FIELD OF THE INVENTION

The present invention relates to power distribution systems, and, in particular but not exclusively, tap off boxes for use with busbar trunking systems (BTSs).

BACKGROUND

Traditional power distribution systems used in industrial facilities employ lengths of electrical cable housed in cable trays. Installation of cable trays and the associated cables is labour intensive, as is any reconfiguration of the power distribution system to take into account new loads that are to be connected to the system.

A BTS may be used to overcome many of the above-described problems. A BTS uses a number of BTS sections connected together, each BTS section comprising a series of electrical conductors enclosed within a protective housing. Tap off boxes are used to carry power from the conductors for supply to each load.

Installation and reconfiguration is simplified compared to cable/cable tray based systems, but safe installation and reliable operation of tap off boxes, in terms of the mechanical and electrical connection to the BTS and conductors therein can still be problematic.

It is an aim of the present invention to address at least one problem associated with the prior art, whether referred to herein or otherwise.

SUMMARY OF THE INVENTION

According to a first aspect of the present invention, there is provided a tap off box for use with a BTS comprising at least one conducting bar, the tap off box comprising an inlet contact, a movable sheath for the inlet contact and an electrical outlet in electrical communication with the inlet contact, wherein, when the tap off box is in a mounted position on a BTS, movement of the sheath to a first position breaks an electrical connection between the conducting bar and the electrical outlet.

Such a tap off box provides a safe means for breaking the connection between the conducting bars and the electrical outlet, thereby reducing the risk of electrocution when the tap off box is mounted on the BTS. Additionally, movement of the sheaths to break the contact is more advantageous than movement of the inlet contacts, as it simplifies the design of the inlet contacts and the wiring within the box by eliminating the need for movable cable within the box, and reduces the amount of movement needed at the contacts in order to safely break the connection.

In one example, movement of the sheath to the first position breaks an electrical connection between the conducting bar and the inlet contact thereby breaking the electrical connection between the conducting bar and the electrical outlet. This means that the tap off box can be completely isolated from the conducting bar, further improving the safety of the tap off box.

In one example, when the tap off box is in the mounted position, movement of the sheath to a second position makes the electrical connection between the conducting bar and the electrical outlet. This allows electrical power to be delivered to the electrical outlet. In an example, when the tap off box is in the mounted position, movement of the sheath to a second position makes an electrical connection between the conducting bar and the inlet contact, thereby making the electrical connection between the conducting bar and the electrical outlet.

In one example, the first position is an extended position relative to the outside of the tap off box and the second position is a retracted position relative to the outside of the tap off box. This means that the sheath can make or break the connection between the conducting bar and an inlet contact which extends outside the tap off box towards a conducting bar of the BTS.

In one example, the sheath is at least partially within the tap off box when the sheath is in the second position. This means that a reliable contact can be formed between the inlet contact and the conducting bar when the sheath is in the second position, and means that the tap off box is relatively compact.

In one example, the sheath lies adjacent to one or more sides of the inlet contact when the sheath is in the first position.

In one example, the sheath lies adjacent to one or more sides of the inlet contact when the sheath is in the first position. In an example, the sheath lies adjacent to two sides of the inlet contact when the sheath is in the first position. In one example, the sheath surrounds the inlet contact when the sheath is in the first position.

In one example, the sheath is arranged to slide to the first position. In one example, the sheath is arranged to move to the first position in a generally linear manner. These are simple mechanisms by which the sheath can make or break the electrical connection.

In one example, the inlet contact is biased towards electrical connection with the bar when the tap off box is in the mounted position. In one example, the sheath acts against the inlet contact's bias when the sheath is in the first position to prevent electrical connection of the contact with the bar. In one example, the sheath compresses the inlet contact when in the first position. These features facilitate a good electrical connection between the inlet contact and the conducting bar when the sheath is in the retracted position.

In one example, the tap off box comprises a mechanical connector operable in use to connect the tap off box to the BTS in the mounted position.

In one example, the mechanical connector provides a push fit to mount the tap off box to the BTS.

In one example, the mechanical connector comprises a socket to receive the BTS and hold the BTS therein.

In one example, the mechanical connector provides an interference fit to mount the tap off box to the BTS.

In one example, the mechanical connector is biased towards a closed position and comprises a mechanism for driving the mechanical connector away from the closed position into an open position, wherein the tap off box is moveable to the mounting position when the mechanical connector is in the open position and the mechanical connector connects the tap off box to the BTS when the tap off box is in the mounted position and the mechanical connector is in the closed position.

In one example, the mechanical connector comprises a first resilient arm, the arm having a lip, wherein the lip is received in a channel of the BTS when the tap off box is in the mounted position.

In one example, the arm and the lip extend substantially along the tap off box.

In one example, the tap off box comprises a second resilient arm corresponding to the first resilient arm, and opposed thereto.

In one example, the tap off box comprises an interlock between the sheath and the mechanical connector, wherein the interlock is arranged to prevent movement of the tap off box into the mounted position unless the sheath is in the first position.

In one example, the tap off box comprises comprising an interlock between the sheath and the mechanical connector, wherein the interlock is arranged to prevent movement of the tap off box out of the mounted position unless the sheath is in the first position.

In one example, the tap off box further comprises an actuation mechanism by which the sheath is moved.

In one example, the tap off box comprises a circuit breaker, and the actuation mechanism is operable only when the circuit breaker is in an off position.

In one example, the actuation mechanism is operated by a key in a keyhole, and wherein the keyhole is inaccessible when a circuit breaker of the tap off box is in an on position.

In one example, the tap off box comprises a plurality of inlet contacts and sheaths.

In one example, the tap off box comprises four inlet contacts and sheaths, or comprises five contacts and sheaths.

According to a second aspect of the present invention there is provided a power distribution system comprising a tap off box of as described above and a BTS to which the tap off box is mounted.

According to a third aspect of the present invention there is provided a kit of parts for a power distribution system, the kit comprising a tap off box as described in relation to the first aspect above, and a BTS to which the tap off box can be mounted.

In one example, the BTS comprises a conducting bar formed of a pair of opposed conductors arranged to in use receive the inlet contact and the sheath there-between.

In one example, the BTS comprises a pre-defined tap off point.

In one example, the power distribution system or kit of parts comprises an ancillary cover to cover the conducting bar at a portion thereof where no tap off box is mounted to the BTS.

According to a fourth aspect of the present invention there is provided a method of breaking the electrical connection between a conducting bar of a BTS and electrical outlet of in a tap off box that is mounted on the BTS, the method comprising moving a sheath of an inlet contact of the tap off box.

According to the present invention there is provided a tap off box, power distribution system or kit substantially as herein-described, with reference to the accompanying drawings According to the present invention there is provided an apparatus and method as set forth in the appended claims. Other features of the invention will be apparent from the dependent claims, and the description which follows.

BRIEF DESCRIPTION OF THE DRAWINGS

For a better understanding of the invention, and to show how embodiments of the same may be carried into effect, reference will now be made, by way of example, to the accompanying diagrammatic drawings in which.

DESCRIPTION OF EXAMPLE EMBODIMENTS

Figure 1:
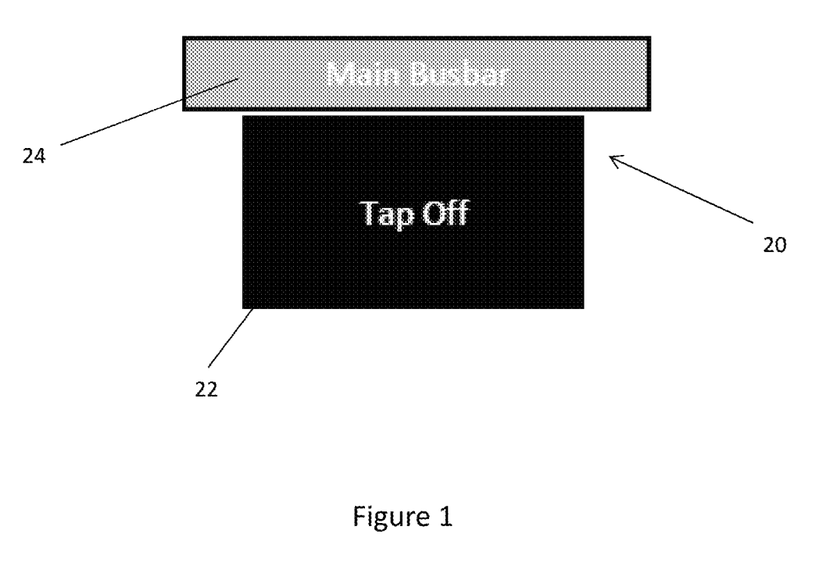
FIG. 1 is a schematic drawing of a portion of a power distribution system.

Referring to FIG. 1, there is shown a schematic drawing of a portion of a power distribution system 20. The power distribution system 20 as shown comprises a tap off box 22 in a mounted position on a BTS 24.

Figure 2:
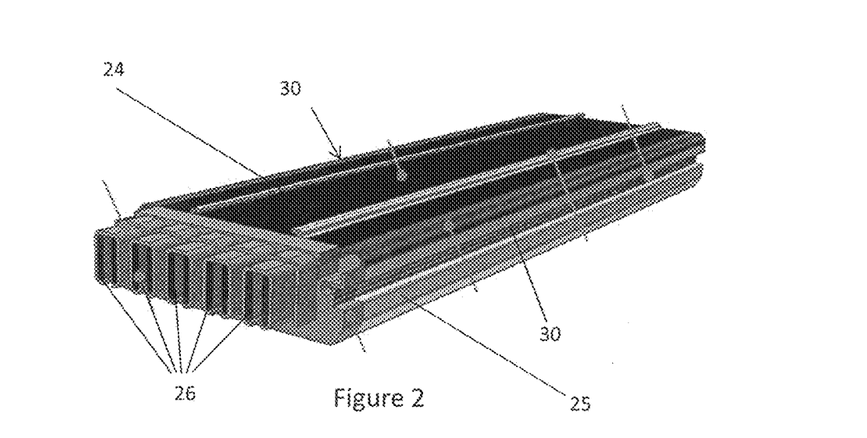
FIG. 2 is a perspective view of a section of a BTS.
Figure 3:
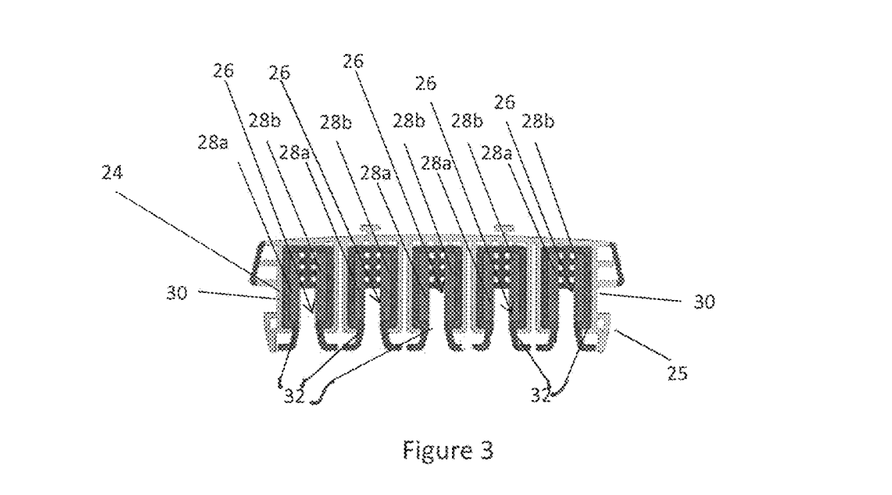
FIG. 3 is an end sectional view of a BTS section.

Referring to FIG. 2 and FIG. 3, there is shown a section of BTS 24. The section of BTS 24 comprises a housing 25, which contains five conducting bars 26. The conducting bars 26 extend in a longitudinal direction along the length of the section of BTS 24. The conducting bars 26 are separated from each other in a transverse direction, i.e. a direction perpendicular to the longitudinal direction and across the section of BTS 24.

Each conducting bar 26 comprises a pair of opposed conductors 28a, 28b. The opposed conductors 28a, 28b extend along the length of the section of BTS 24. The opposed conductors 28a, 28b of each conducting bar are spaced apart from each other in the transverse direction, so that there is space between the opposed conductors 28a, 28b.

The section of BTS 24 may be connected to an adjacent section of the BTS to electrically connect the conducting bars 26 to conducting bars of the adjacent section. This means that current can flow through the BTS, along the conducting bars 26 in the longitudinal direction through each BTS section.

The housing 25 comprises a pair of channels 30. The channels 30 are located along opposing sides of the housing 25. The channels 30 extend along the length of the section of the BTS 24, and are parallel to the conducting bars 26.

The housing 25 comprises a series of shrouds 32. The housing 25 comprises one shroud 32 for each pair of opposed conductors 28a, 28b. The shrouds 32 provide an electrically insulating barrier between the opposed conductors 28a, 28b and the external parts of the housing 25. The shrouds 32 are arranged so that each defines a space in which the opposed conductors 28a, 28b of each conducting bar 26 locate, and into which an inlet contact of a tap off box can be received, as described in more detailed below.

The section of BTS 24 may comprise a pre-defined tap off point for connection of a tap off box, or may receive a tap off box at any position along its length. Additionally, the section of BTS 24 may comprises an ancillary cover (not shown) to cover the pre-defined tap off point, or more generally the spaces between the opposed conductors 28a, 28b when no tap off box is connected to the section of BTS 24.

Figure 4:
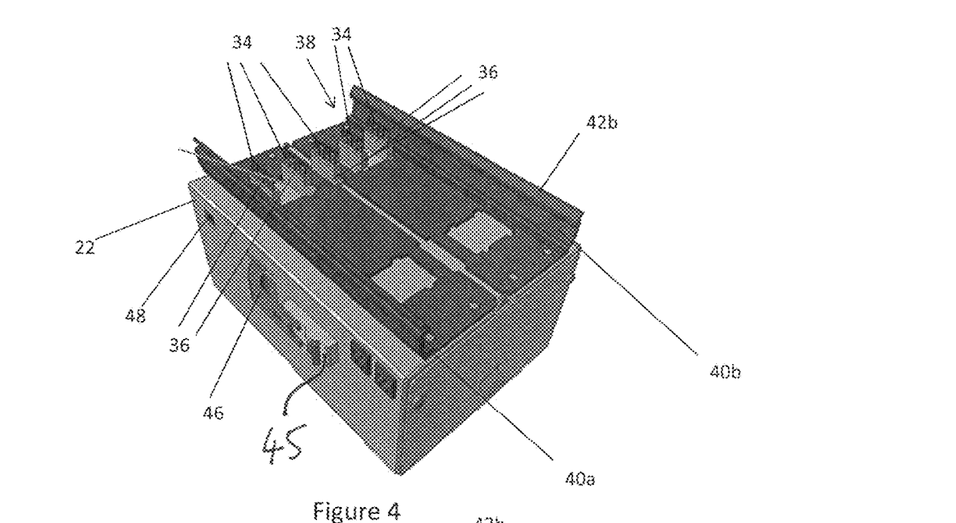
FIG. 4 is a perspective view of a tap off box with sheaths in a retracted position.
Figure 5:
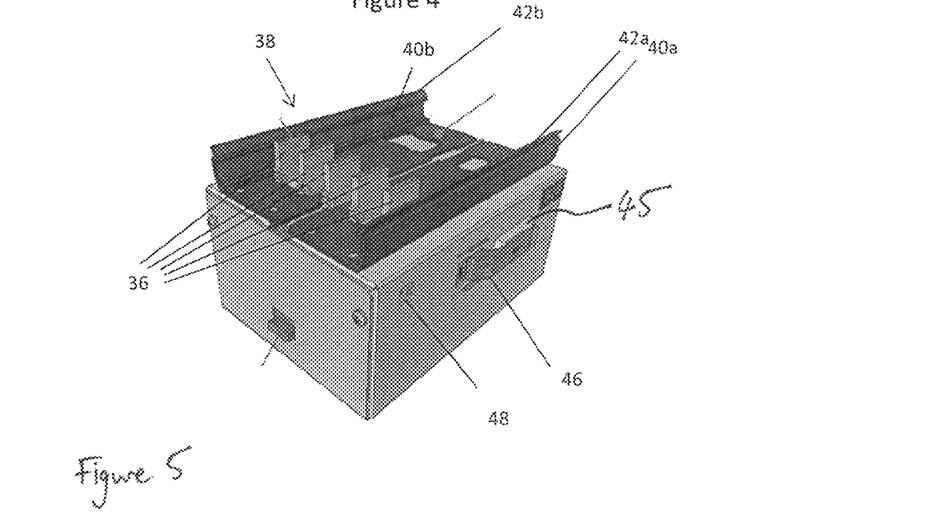
FIG. 5 is a perspective view of a tap off box with sheaths in an extended position.
Figure 6:
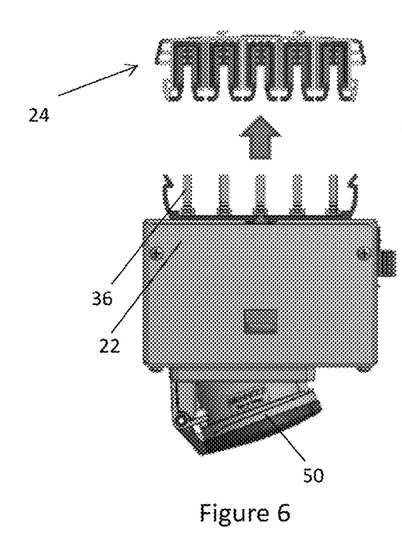
FIGS. 6 to 9 are end views of a BTS and a tap off box showing a mounting operation.

Referring to FIG. 4 and FIG. 5, there is shown a tap off box 22 for use with the section of BTS 24. The tap off box 22 comprises an inlet contact 34 for each conducting bar 26. The tap off box 22 comprises five inlet contacts 34. The inlet contacts 34 are in electrical communication with an electrical outlet, shown as item 50 in FIGS. 6 to 9. The inlet contacts 34 extend outwardly from an upper surface of the tap off box 22.

The tap off box 22 comprises a movable sheath 36 for the inlet contacts 34, for example one sheath 36 for each inlet contact 34. The tap off box 22 comprises five sheaths 36.

FIG. 5 shows the sheaths 36 in a first position. The first position is an extended position relative to the outside of the tap off box 22. Each sheath 36 lies adjacent to the sides of the inlet contact 34 when the sheath 36 is in the first position. More specifically, in this embodiment each sheath 36 surrounds the corresponding inlet contact 34 when the sheath 36 is in the first position. Each sheath 36 extends at least as far as the inlet contact 34, outwardly from the tap off box 22, and in substantially the same direction as the inlet contact 34.

FIG. 4 shows the sheaths 36 in a second position. The section position is a retracted position relative to the outside of the tap off box 22. In the second position the sheaths 36 are partially within the tap off box 22. Each inlet contact 34 extends outwardly from the tap off box 22 further than the corresponding sheath 36 when the sheath 36 is in the second position. Each inlet contact 34 comprises a series of resilient members, shown as item 37 in FIG. 10, which are biased outwardly, towards sides of the tap off box 22.

The tap off box 22 comprises a mechanical connector 38 to provide a push-fit mounting on the section of BTS 24. The mechanical connector 38 comprises a socket generally formed by a first arm 40a and a second arm 40b. The first arm 40a and the second arm 40b protrude outwardly from the tap off box 22 in the same direction as the inlet connectors 34. The first arm 40a and the second arm 40b are located at opposite edges of the tap off box 22, at either side of the upper surface of the tap off box 22. The first arm 40a and the second arm 40b extend substantially along a length of the tap off box 22. Each of the first arm 40a and the second arm 40b comprises a lip 42a, 42b. The lips 42a, 42b protrude inwardly, in a direction substantially parallel to the upper surface of the tap off box 22, and in this example embodiment extend substantially along the length of the arms 40a, 40b.

The tap off box comprises a circuit breaker 45. The tap off box comprises an actuation mechanism (not shown) for the sheaths 36. The actuation mechanism is activated by turning a key, shown as item 52 in FIG. 9, in a keyhole 48. So that the actuation mechanism is operable only when the circuit breaker 45 is in an off position, a further interlock is provided. The further interlock comprises a blocking member 46, which can be moved to block or unblock the keyhole 48. In moving to unblock the keyhole the blocking member 46 switches off the circuit breaker 45.

Referring to FIG. 6 to FIG. 9, there is shown a tap off box 22 and a section of BTS 24. For clarity, not all reference numerals are shown on FIGS. 6 to 9. However, it will be appreciated that the tap off box and the section of the BTS of these figures have the same features as those described in FIGS. 2 to 5.

In use, the tap off box 22 is mounted on the section of BTS 24. The tap off box 22 comprises an interlock (not shown) between the sheaths 36 and the mechanical connector 38. The interlock prevents movement of the tap off box 22 into the mounted position on the section of the BTS 24 unless the sheaths 36 are in the first position, as in FIG. 6 to FIG. 8.

Figure 7:
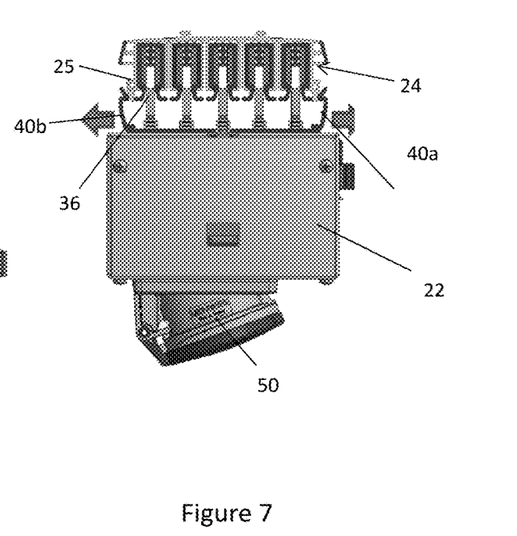
Figure 8:
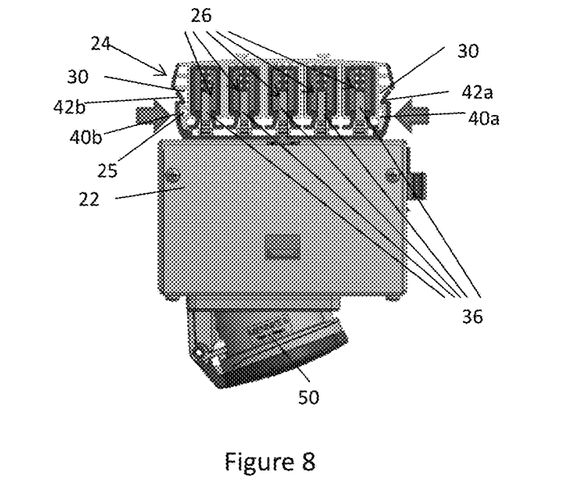

When the sheaths 36 are in the first position, the mechanical connector 38 provides a push fit to mount the tap off box 22 to the section of BTS 24. The upper surface of the tap off box 22 is pushed against a lower surface of the section of BTS 24 as shown in FIG. 7. The arms 40a, 40b move outwardly, so that the housing 25 is received within the socket of the mechanical connector 38 when the tap off box 22 is in the mounted position on the section of BTS 24, as shown in FIG. 8. The lips 42a, 42b are received within the channels 30 to form a mechanical connection between the arms 40a, 40b and the housing 25. The mechanical connector 38 provides an interference fit to mount the tap off box to the section of BTS 24.

When the tap off box 22 is in the mounted position and the sheaths 36 are in the first position, each sheath 36 is received in the space between opposed conductors 28a, 28b. The sheaths 36 prevent an electrical connection being formed between the inlet contacts 34 and the conducting bars 26.

Figures 9, 10:
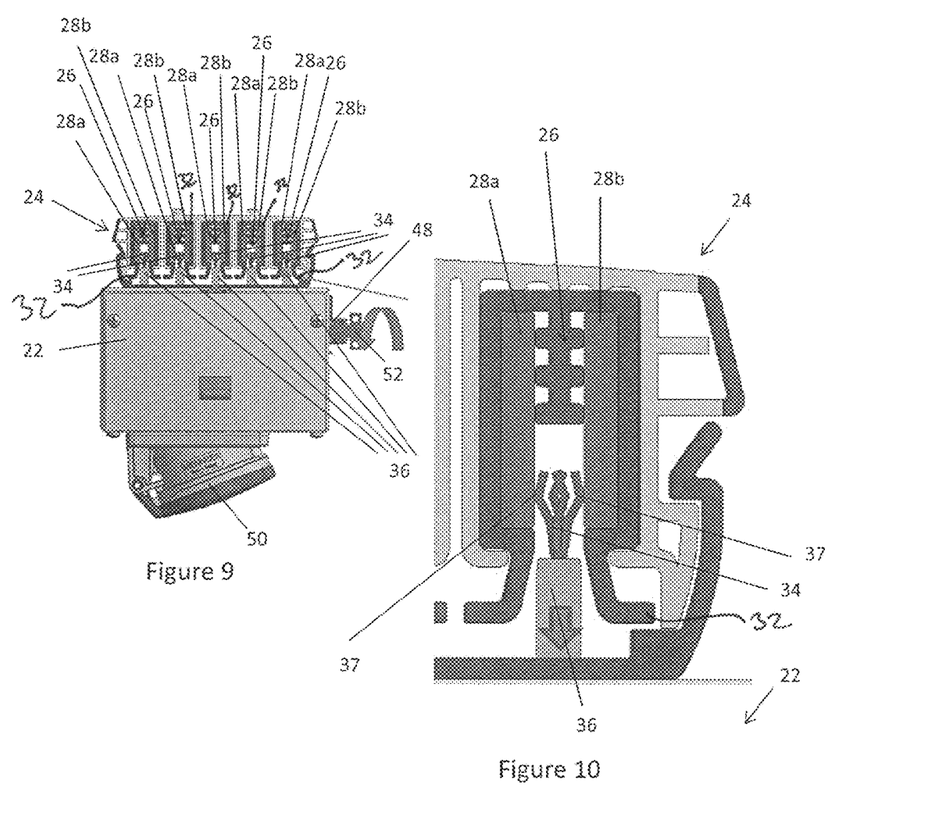
FIG. 10 is a close up view of an inlet contact and a conducting bar.

Referring to FIG. 9 and FIG. 10, there is shown a tap off box 22 in a mounted position on a section of BTS 24, with the sheaths 36 in the second position. For clarity, not all reference numerals are shown on FIGS. 6 to 9. However, it will be appreciated that the tap off box and the section of BTS of these figures have the same features as those of FIGS. 2 to 5.

When the tap off box 22 is in the mounted position and the sheaths 36 are in the second position, each inlet contact 34 is received in the space between opposed conductors 28a, 28b. The inlet contacts 34 are biased towards electrical connection with conducting bar 26. More specifically, the resilient members 37 are biased outwardly toward, and into contact with inner surfaces of the opposed conductors 28a, 28b. The direction in which the resilient members 37 are biased is the transverse direction when the tap off box 22 is in the mounted position.

When the tap off box 22 is in the mounted position, movement of the sheaths 36 to the second position, as shown by FIG. 10, makes the electrical connection between the conducting bars 26 and the electrical outlet 50. More specifically, when the tap off box 22 is in the mounted position, movement of the sheaths 36 to a second position makes an electrical connection between the conducting bars 26 and the inlet contacts 34, thereby making the electrical connection between the conducting bar 26 and the electrical outlet 50.

When the tap off box 22 is in the mounted position, movement of the sheaths 36 to the first position, as shown by FIG. 8, breaks the electrical connection between the conducting bars 26 and the electrical outlet 50. More specifically, when the tap off box 22 is in the mounted position, movement of the sheaths 36 to the first position breaks the electrical connection between the conducting bars 26 and the inlet contacts 34, thereby breaking the electrical connection between the conducting bar 26 and the electrical outlet 50. Movement of the sheaths 36 to the first position acts against the bias of the inlet contacts 34, to maintain the inlet contacts away from the conducting bars 26, and prevent the electrical connection therebetween. The sheath 36 compresses the inlet contact 34 when the sheath 36 is in the first position. The connection remains reliably broken while the tap off box 22 is in the second position, despite only a small amount of movement been needed from any electrically conducting element. By localising movement at the inlet contact, and minimising it, only elastic deformation well within the yield limits of the contacts is possible, meaning that the connection is better able to cope with a large number of use cycles over its lifetime.

Movement of the sheaths 36 between the first and second positions is effected by the actuation mechanism (not shown). The actuation mechanism is activated by turning the key 52 in the keyhole 48, for safety reasons. However, it will be appreciated that the actuation mechanism may be activated by other means.

Movement of the sheaths 36 between the first position and the second position takes place in a generally linear manner. The sheaths 36 slide between the first position and the second position. It will be appreciated that the sheaths could in other embodiments move between the first position and the second position in a manner other than linear sliding, for example, by rotating about a point, or movement in the longitudinal direction of the BTS 24.

In an alternative example (not shown) the mechanical connector is biased towards a closed position and comprises a mechanism for driving the mechanical connector away from the closed position into an open position. The tap off box is moveable to the mounted position only when the mechanical connector is in the open position. The mechanical connector connects the tap off box to the BTS when the tap off box is in the mounted position and the mechanical connector is in the closed position.

In practice, this may be achieved by the mechanical connector comprising arms similar to those described above. The arms are biased inwardly towards a close position, similar to the position of the arms of FIG. 9. However, the arms are not as deformable as those of the tap off box 22, and the mechanism is used to release the arms to move outwardly, or to positively drive the arms outwardly into the open position, to enable the tap off box to be moved into or out of the mounted position.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

We claim:

1. A tap off box for use with a busbar trunking system (BTS) comprising at least one conducting bar, the tap off box comprising:
   an inlet contact;
   a movable sheath for the inlet contact; and
   an electrical outlet in electrical communication with the inlet contact,
   wherein, when the tap off box is in a mounted position on the BTS, movement of the sheath to a first position positions the sheath between the inlet contact and a conducting bar so as to break an electrical connection between the conducting bar and the electrical outlet.

2. The tap off box of claim 1, wherein, when the tap off box is in the mounted position, movement of the sheath to a second position makes the electrical connection between the conducting bar and the electrical outlet.

3. The tap off box of claim 2, wherein, when the tap off box is in the mounted position, movement of the sheath to the first position breaks an electrical connection between the conducting bar and the inlet contact thereby breaking the electrical connection between the conducting bar and the electrical outlet, and wherein movement of the sheath to the second position makes an electrical connection between the conducting bar and the inlet contact, thereby making the electrical connection between the conducting bar and the electrical outlet.

4. The tap off box of claim 2, wherein the first position is an extended position relative to an outside of the tap off box and the second position is a retracted position relative to the outside of the tap off box.

5. The tap off box of claim 4, wherein the sheath is at least partially within the tap off box when in the second position.

6. The tap off box of claim 2, wherein the sheath moves between the first position and the second position in a generally linear manner.

7. The tap off box of claim 1, wherein the sheath lies adjacent to one or more sides of the inlet contact when the sheath is in the first position.

8. The tap off box of claim 7, wherein the sheath surrounds the inlet contact when in the first position.

9. The tap off box of claim 1, wherein the sheath is arranged to slide to the first position.

10. The tap off box of claim 1, wherein the inlet contact is biased towards electrical connection with the conducting bar when the tap off box is in the mounted position.

11. The tap off box of claim 10, wherein the sheath acts against the inlet contact's bias when the sheath is in the first position to prevent electrical connection of the contact with the bar.

12. The tap off box of claim 11, wherein the sheath compresses the inlet contact when in the first position.

13. The tap of box of claim 1, comprising a mechanical connector operable in use to connect the tap off box to the BTS in the mounted position, wherein the mechanical connector provides a push fit to mount the tap off box to the BTS.

14. The tap off box of claim 13, wherein the mechanical connector comprises a first arm, the arm having a lip, wherein the lip is received in a channel of the BTS when the tap off box is in the mounted position.

15. The tap off box of claim 14, wherein the mechanical connector further comprises a second arm corresponding to the first arm, and opposed thereto.

16. The tap off box of claim 13, comprising an interlock between the sheath and the mechanical connector, wherein the interlock is arranged to prevent movement of the tap off box into and/or out of the mounted position unless the sheath is in the first position.

17. The tap off box of claim 1, further comprising an actuation mechanism by which the sheath is moved and a circuit breaker, and wherein the actuation mechanism is operable only when the circuit breaker is in an off position.

18. A power distribution system comprising: the tap off box of claim 1; and a section of BTS to which the tap off box is mounted.

19. A method of breaking an electrical connection between a conducting bar of a busbar trunking system (BTS) and an electrical outlet of a tap off box that is mounted on the BTS, the tap off box comprising an inlet contact, a movable sheath for the inlet contact, and the electrical outlet which is in electrical communication with the inlet contact, the method comprising moving the sheath of the inlet contact of the tap off box such that, when the tap off box is a mounted position on the BTS, movement of the sheath to a first position positions the sheath between the inlet contact and the conducting bar so as to break the electrical connection between the conducting bar and the electrical outlet.

* * * * *